United States Patent
Hu et al.

(10) Patent No.: US 11,323,873 B2
(45) Date of Patent: May 3, 2022

(54) METHOD FOR WIRELESS FIDELITY CONNECTION AND RELATED PRODUCTS

(71) Applicant: Guangdong Oppo Mobile Telecommunications Corp., Ltd., Guangdong (CN)

(72) Inventors: Yadong Hu, Guangdong (CN); Yi Yu, Guangdong (CN); Shimin Jiang, Guangdong (CN); Botao Cu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 233 days.

(21) Appl. No.: 16/535,847

(22) Filed: Aug. 8, 2019

(65) Prior Publication Data

US 2019/0364497 A1   Nov. 28, 2019

Related U.S. Application Data

(63) Continuation of application No. PCT/CN2017/103172, filed on Sep. 25, 2017.

(30) Foreign Application Priority Data

Feb. 20, 2017   (CN) .......................... 201710091097.5

(51) Int. Cl.
*H04W 48/20* (2009.01)
*H04L 12/28* (2006.01)
(Continued)

(52) U.S. Cl.
CPC .......... *H04W 12/03* (2021.01); *H04B 17/318* (2015.01); *H04W 8/005* (2013.01); *H04W 48/16* (2013.01); *H04W 48/20* (2013.01)

(58) Field of Classification Search
CPC ..... H04W 12/02; H04W 12/03; H04W 48/20; H04W 12/001; H04W 48/16;
(Continued)

(56) References Cited

U.S. PATENT DOCUMENTS

2007/0249291 A1* 10/2007 Nanda ............. H04W 36/00835
455/73
2008/0082543 A1*  4/2008 Abhishek ............... H04W 48/18
(Continued)

FOREIGN PATENT DOCUMENTS

CN       104394263 A     3/2015
CN       104412664 A     3/2015
(Continued)

OTHER PUBLICATIONS

English translation of the First Office Action issued in corresponding CN application No. 201710091097.5 dated Apr. 1, 2019.
(Continued)

*Primary Examiner* — Rebecca E Song
*Assistant Examiner* — Vanneilian Lalchinthang
(74) *Attorney, Agent, or Firm* — Young Basile Hanlon & MacFarlane, P.C.

(57) ABSTRACT

A method for Wi-Fi connection and related products are provided. The method includes performing a Wi-Fi scan to obtain information of M APs, where M is a positive integer. Information of N APs that satisfies a predetermined requirement is selected from the information of the M APs to generate a first Wi-Fi list, where N is a positive integer smaller than or equal to M. According to the first Wi-Fi list, X Wi-Fi lists are determined from historical data of Wi-Fi connection, where each of the X Wi-Fi lists corresponds to an AP previously connected, the historical data of Wi-Fi connection contains Y Wi-Fi lists, Y is a positive integer, and
(Continued)

X is a positive integer smaller than or equal to M. The first Wi-Fi list is updated according to the X Wi-Fi lists.

16 Claims, 5 Drawing Sheets

(51) Int. Cl.
  *H04W 12/03* (2021.01)
  *H04B 17/318* (2015.01)
  *H04W 8/00* (2009.01)
  *H04W 48/16* (2009.01)

(58) Field of Classification Search
  CPC .... H04W 76/10; H04W 8/005; H04B 17/318; H04M 15/8271; H04L 12/4625
  USPC .......................................................... 370/329
  See application file for complete search history.

(56) References Cited

U.S. PATENT DOCUMENTS

| | | | | |
|---|---|---|---|---|
| 2008/0198811 | A1* | 8/2008 | Deshpande | H04W 48/16 370/332 |
| 2010/0309815 | A1* | 12/2010 | Yepez | H04L 12/4625 370/254 |
| 2011/0286437 | A1* | 11/2011 | Austin | H04W 72/0413 370/338 |
| 2015/0131460 | A1* | 5/2015 | Sridhara | G01S 11/06 370/252 |
| 2015/0319604 | A1* | 11/2015 | Gao | H04W 4/025 370/338 |
| 2016/0014824 | A1* | 1/2016 | Xiang | H04W 16/10 370/329 |
| 2016/0095049 | A1* | 3/2016 | Fan | H04W 48/16 370/254 |
| 2016/0142921 | A1* | 5/2016 | Guday | H04W 4/023 455/456.5 |
| 2017/0127376 | A1* | 5/2017 | Jones | H04W 4/02 |
| 2017/0228830 | A1* | 8/2017 | Song | G06Q 20/3224 |
| 2018/0063673 | A1* | 3/2018 | Jang | H04W 4/33 |

FOREIGN PATENT DOCUMENTS

| | | |
|---|---|---|
| CN | 104427587 A | 3/2015 |
| CN | 104936181 A | 9/2015 |
| CN | 105142203 A | 12/2015 |
| CN | 105430764 A | 3/2016 |
| CN | 106255106 A | 12/2016 |
| EP | 2880931 A1 | 6/2015 |
| KR | 20110055897 A | 5/2011 |
| WO | 2016180210 A1 | 11/2016 |

OTHER PUBLICATIONS

English translation of the Second Office Action issued in corresponding CN application No. 201710091097.5 dated Jul. 15, 2019.
International search report issued in corresponding international application No. PCT/CN2017/103172 dated Jan. 3, 2018.
First Examination Report issued in corresponding IN application No. 201917032407 dated Dec. 7, 2020.
Extended European search report issued in corresponding application No. 17896741.0 dated Nov. 20, 2019.
Communication pursuant to Article 94(3) EPC for EP Application 17896741.0 dated Sep. 9, 2021. (4 pages).

* cited by examiner

METHOD FOR WIRELESS FIDELITY CONNECTION AND RELATED PRODUCTS

CROSS-REFERENCE TO RELATED APPLICATION(S)

This application is a continuation of International Application No. PCT/CN2017/103172, filed on Sep. 25, 2017, which claims priority to Chinese Patent Application No. 201710091097.5, filed on Feb. 20, 2017, both of which are incorporated herein by reference in their entireties.

TECHNICAL FIELD

The present disclosure relates to the technical field of communications, and particularly to a method for wireless fidelity (Wi-Fi®) connection and related products.

BACKGROUND

With rapid development of information technologies, terminals such as mobile phones and tablet computers become increasingly popular. User requirements on the terminals also become increasingly high. There is not only a need for a relatively high processing speed, but also an increasing dependence on Wi-Fi. With popularization of the terminals and Wi-Fi, it is frequent to connect the terminals to a Wi-Fi network.

In the present technology, one or more access points (APs) may be selected to be hidden to improve security of the APs.

SUMMARY

Implementations of the present disclosure provide a method for Wi-Fi connection and related products.

According to a first aspect of the implementations of the present disclosure, a method for Wi-Fi connection is provided. The method includes the following.

Wi-Fi scan is performed to obtain information of M APs, where M is a positive integer. Information of N APs that satisfies a predetermined requirement is selected from the information of the M APs to generate a first Wi-Fi list, where N is a positive integer smaller than or equal to M. According to the first Wi-Fi list, X Wi-Fi lists are determined from historical data of Wi-Fi connection, where each of the X Wi-Fi lists corresponds to an AP previously connected, the historical data of Wi-Fi connection contains Y Wi-Fi lists, Y is a positive integer, and X is a positive integer smaller than or equal to M. The first Wi-Fi list is updated according to the X Wi-Fi lists.

According to a second aspect of the implementations of the present disclosure, a terminal is provided. The terminal includes at least one processor, and a computer readable memory coupled to the at least one processor and storing at least one computer executable instruction therein, which when executed by the at least one processor, causes the at least one processor to carry out the following actions. Wi-Fi scan is performed to obtain information of M APs, where M is a positive integer. Information of N APs that satisfies a predetermined requirement is selected from the information of the M APs to generate a first Wi-Fi list, where N is a positive integer smaller than or equal to M. According to the first Wi-Fi list, X Wi-Fi lists are determined from historical data of Wi-Fi connection, where each of the X Wi-Fi lists corresponds to an AP previously connected, the historical data of Wi-Fi connection contains Y Wi-Fi lists, Y is a positive integer, and X is a positive integer smaller than or equal to M. The first Wi-Fi list is updated according to the X Wi-Fi lists.

According to a third aspect of the implementations of the present disclosure, a non-transitory computer-readable storage medium is provided. The storage medium stores at least one computer program which, when executed by at least one processor, causes the at least one processor to carry out the following actions. Wi-Fi scan is performed to obtain information of M access points (APs), where M is a positive integer. From the information of the M APs, information of N APs is selected, where the information of each of the N APs satisfies a predetermined requirement, and N is a positive integer smaller than or equal to M. From historical data of Wi-Fi connection, information of multiple candidate APs are determined by comparing the information of the N APs with the historical data of Wi-Fi connection, where each of the plurality of candidate APs is able to be connected by a terminal in current environment. The information of the candidate APs and the information of the N APs are displayed on the terminal for selection.

BRIEF DESCRIPTION OF THE DRAWINGS

To describe technical solutions in implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
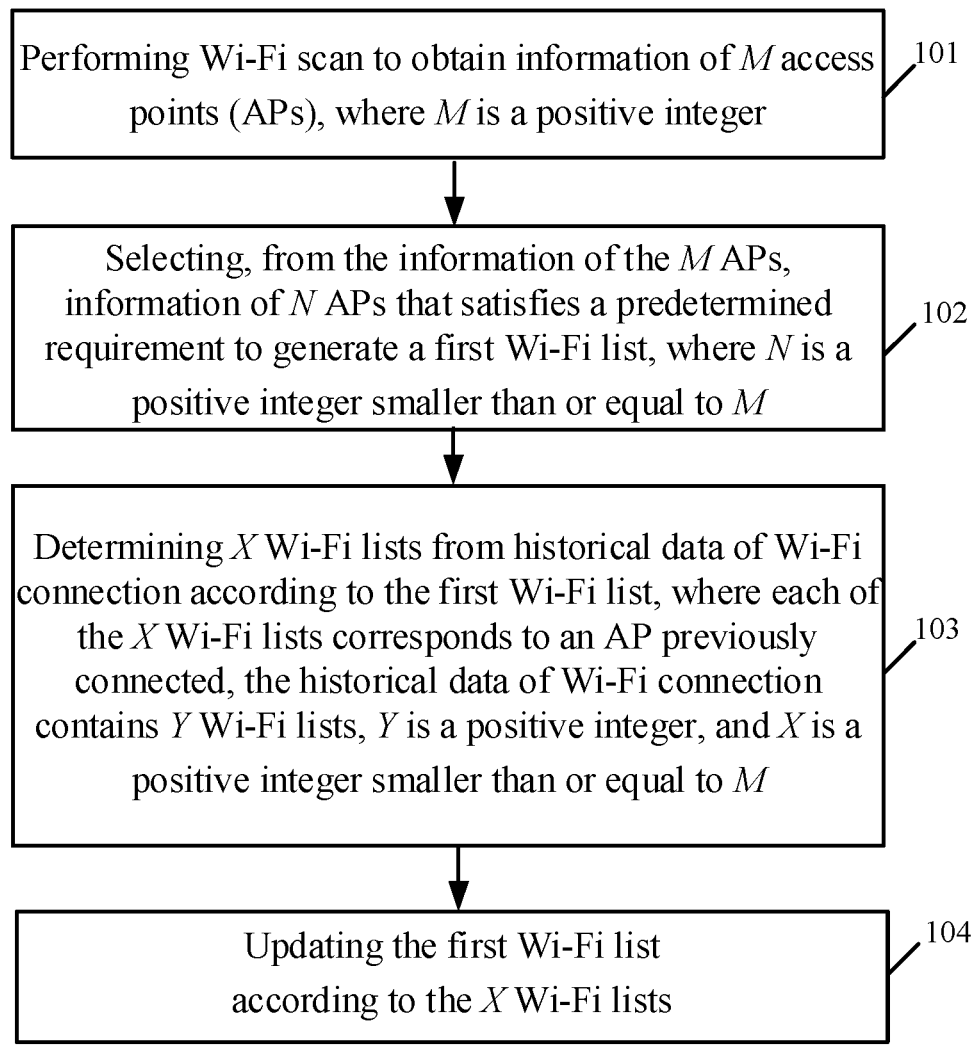
FIG. 1 is a flow chart illustrating a method for Wi-Fi connection according to a first implementation of the present disclosure.

In related arts, in a process of wireless fidelity (Wi-Fi) scan, a problem may occur. Taking a certain access point (AP) to which a terminal was previously connected as an example, before the AP is hidden, the terminal can find the AP by Wi-Fi scan and then be connected to the AP; however, after the AP is hidden, the terminal cannot find the AP. Therefore, implementations of the present disclosure provide a method for Wi-Fi connection and related products, which can search hidden APs automatically.

Technical solutions of the present disclosure will be further described below through implementations with reference to the accompanying drawings. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", "third", "fourth", and the like used in the specification, the claims, and the accompany drawings of the present disclosure are used to distinguish different objects rather than describe a particular order. Further, the terms "include", "comprise", and "have" as well as variations thereof are intended to cover non-exclusive inclusion. For example, a process, method, system, product, or apparatus including a series of steps or units is not limited to the listed steps or units; on the contrary, it can optionally include other steps or units that are not listed; alternatively, other steps or units inherent to the process, method, product, or device can be included either.

"Implementation" mentioned in the disclosure means that specific characteristics, structures, or properties described in connection with an implementation may be included in at least one implementation of the disclosure. This word displayed at each position in the specification does not refer to the same implementation as well as an independent or alternate implementation mutually exclusive to other implementations. It may be explicitly and implicitly understood by those skilled in the art that the implementations described in the disclosure may be combined with the other implementations.

A terminal described in the implementations of the disclosure may include a smart phone (such as an Android® phone, an iOS® phone, and a Windows® phone), a tablet computer, a palmtop computer, a notebook computer, a mobile Internet device (MID), wearable equipment, or the like, which are not exhausted but only listed as examples. The terminal includes, but is not limited to, the listed terminals.

Generally, when a specified AP is not added in response to user operation, the AP cannot be displayed. Therefore, a hidden AP that is not recorded by a terminal cannot be displayed in a Wi-Fi list after Wi-Fi scan of the terminal. Thus, such a specified AP cannot be selected by a user, and the terminal cannot be connected to the specified AP. Moreover, it is relatively tedious to add an AP via user operations, since the AP is displayed only when an input service set identifier (SSID) is completely matched. If the SSID contains a special character (such as "イ" and "丁") or a symbol (such as "*", "/", or "@"), it may be easy to input an error SSID, and thus it may need to input the specified AP for many times.

In an implementation, historical data of Wi-Fi connection in the implementations of the disclosure may include multiple Wi-Fi lists. Each Wi-Fi list may correspond to an AP previously connected by the terminal. Each Wi-Fi list may include information of multiple APs. For example, after Wi-Fi scan, the terminal may obtain information of multiple APs, and may select APs to generate a Wi-Fi list, where the selected APs each have a signal strength value higher than a preset threshold. In the implementations of the disclosure, an AP not previously connected by the terminal refers to an AP to which the terminal does not select to be connected, or an AP to which the terminal selected to be connected but failed to be connected. An AP previously connected by the terminal refers to an AP to which the terminal selected to be connected and was connected to. The information of one AP may include, but is not limited to: an SSID, a basic service set identifier (BSSID), an encryption scheme, and whether the AP is hidden or not (a hidden state or a non-hidden state). It is to be noted that, when a certain AP is in the hidden state, it is possible to find the AP only by performing Wi-Fi scan according to an SSID or BSSID of the AP. In a practical application, each time after the terminal is connected to an AP, properties of the AP, such as an SSID, a BSSID, an encryption scheme, and whether the AP is hidden or not, may be recorded, and information of multiple APs around the AP are selected to generate a Wi-Fi list, where the multiple APs each have a signal strength value higher than a certain threshold. As such, the historical data of Wi-Fi connection may be obtained.

According to a first aspect of the implementation of the present disclosure, a method for Wi-Fi connection is provided. The method includes the following. Wi-Fi scan is performed to obtain information of M APs, where M is a positive integer. Information of N APs that satisfies a predetermined requirement is selected from the information of the M APs to generate a first Wi-Fi list, where N is a positive integer smaller than or equal to M. According to the first Wi-Fi list, X Wi-Fi lists are determined from historical data of Wi-Fi connection, where each of the X Wi-Fi lists corresponds to an AP previously connected, the historical data of Wi-Fi connection contains Y Wi-Fi lists, Y is a positive integer, and X is a positive integer smaller than or equal to M. The first Wi-Fi list is updated according to the X Wi-Fi lists.

In at least one implementation, from the information of the M APs, the information of the N APs is selected from the information of the M APs as follows. A signal strength value of each of the M APs is obtained from the information of the M APs to obtain M signal strength values. From the M signal strength values, N signal strength values each higher than a first preset threshold are selected, and the information of the N APs each corresponding to one of the N signal strength values are obtained.

In at least one alternative implementation, from the information of the M APs, the information of the N APs is selected from the information of the M APs as follows. A distance between each of the M APs and the terminal is determined to obtain M distances. From the M distances, N distances each smaller than a preset distance threshold are selected, and the information of the N APs each corresponding to one of the N distances are obtained.

In at least one implementation, according to the first Wi-Fi list, the X Wi-Fi lists are determined from the historical data of Wi-Fi connection as follows. A similarity value between the first Wi-Fi list and each of the Y Wi-Fi lists is determined to obtain Y similarity values. From the Y similarity values, X similarity values each larger than a second preset threshold are obtained, and the X Wi-Fi lists each corresponding to one of the X similarity values are obtained.

In at least one implementation, the first Wi-Fi list is updated according to the X Wi-Fi lists as follows. Information of Z APs is extracted from the X Wi-Fi lists, where Z is a positive integer. The information of the Z APs is added to the first Wi-Fi list to obtain a second Wi-Fi list. The second Wi-Fi list is displayed on a screen of the terminal.

In at least one implementation, information of the Z APs is extracted from the X Wi-Fi lists as follows. All APs in the X Wi-Fi lists are obtained. A deduplicating operation is performed on the all APs to obtain the Z APs. The information of the Z APs is obtained.

In at least one implementation, the method further includes the following. At least one AP is selected from the second Wi-Fi list. Another Wi-Fi scan is performed according to information of the at least one AP.

In at least one implementation, the method further includes the following. The another Wi-Fi scan is performed according to a service set identifier (SSID) and an encryption scheme of at the at least one AP.

In at least one implementation, the method further includes the following. The another Wi-Fi scan is performed according to a basic service set identifier (BSSID) of the at least one AP.

According to a second aspect of the implementations of the present disclosure, a terminal is provided. The terminal includes at least one processor, and a computer readable memory, coupled to the at least one processor and storing at least one computer executable instruction therein, which when executed by the at least one processor, causes the at least one processor to carry out the following actions. Wi-Fi scan is performed to obtain information of M APs, where M is a positive integer. Information of N APs that satisfies a predetermined requirement is selected from the information of the M APs to generate a first Wi-Fi list, where N is a positive integer smaller than or equal to M. According to the first Wi-Fi list, X Wi-Fi lists are determined from historical data of Wi-Fi connection, where each of the X Wi-Fi lists corresponds to an AP previously connected, the historical data of Wi-Fi connection contains Y Wi-Fi lists, Y is a positive integer, and X is a positive integer smaller than or equal to M. The first Wi-Fi list is updated according to the X Wi-Fi lists.

According to a third aspect of the implementations of the present disclosure, a non-transitory computer-readable storage medium is provided. The storage medium stores at least one computer program which, when executed by at least one processor, causes the at least one processor to carry out the following actions. Wi-Fi scan is performed to obtain information of M access points (APs), where M is a positive integer. From the information of the M APs, information of N APs is selected, where the information of each of the N APs satisfies a predetermined requirement, and N is a positive integer smaller than or equal to M. From historical data of Wi-Fi connection, information of multiple candidate APs are determined by comparing the information of the N APs with the historical data of Wi-Fi connection, where each of the plurality of candidate APs is able to be connected by a terminal in current environment. The information of the candidate APs and the information of the N APs are displayed on the terminal for selection.

Referring to FIG. 1, FIG. 1 is a schematic flow chart illustrating a method for Wi-Fi connection according to a first implementation of the present disclosure. The method for Wi-Fi connection described in implementations of the disclosure includes the following.

At block 101, Wi-Fi scan is performed to obtain information of M APs, where M is a positive integer.

When a terminal needs to be connected to a Wi-Fi network, a Wi-Fi module may be enabled to perform Wi-Fi scan. After the Wi-Fi scan, information of multiple APs can be obtained.

At block 102, information of N APs is selected from the information of the M APs to generate a first Wi-Fi list, where the information of each of the N APs satisfies a predetermined requirement, and N is a positive integer smaller than or equal to M.

For example, the predetermined requirement may be that a signal strength value is higher than a certain threshold. For another example, the predetermined requirement may be that a distance between an AP and the terminal is smaller than a certain threshold.

In an implementation, at block 102, the information of the N APs that satisfies the predetermined requirement is selected from the information of the M APs as follows.

21) A signal strength value of each of the M APs is obtained from the information of the M APs to obtain M signal strength values.

22) N signal strength values each higher than a first preset threshold are selected from the M signal strength values, and the information of the N APs each corresponding to one of the N signal strength values is obtained.

After the Wi-Fi scan, the terminal can obtain the information of the multiple APs. However, the multiple APs are not all stable. Generally, the closer an AP to the terminal, the higher the signal strength of the AP. Assuming that the information of the M APs is obtained after the Wi-Fi scan, the information of the N APs may be selected from the information of the M APs to generate a target Wi-Fi list, where M is a positive integer, and the N APs each have a signal strength value higher than the first preset threshold. Of course, the target Wi-Fi list may be displayed on a screen of the terminal. The first preset threshold may be set by default or by a user.

In an implementation, at block 102, the information of the N APs that satisfies the predetermined requirement is selected from the information of the M APs as follows.

23) A distance between each of the M APs and the terminal is determined to obtain M distances.

24) N distances each smaller than a preset distance threshold are selected from the M distances, and the information of the N APs each corresponding to one of the N distances is obtained.

Each of the M APs may have a fixed position, and a position of the terminal may be obtained via a global positioning system (GPS) or Wi-Fi positioning technologies. Therefore, the distance between each of the M APs and the terminal may be determined to obtain the M distances. The preset distance threshold may be set by default or by a user. The N distances each smaller than the preset distance threshold may be selected from the M distances, and the information of the N APs each corresponding to one of the N distances may be obtained.

At block 103, according to the first Wi-Fi list, X Wi-Fi lists are determined from historical data of Wi-Fi connection, where each of the X Wi-Fi lists corresponds to an AP previously connected by the terminal, the historical data of Wi-Fi connection contains Y Wi-Fi lists, Y is a positive integer, and X is a positive integer smaller than or equal to M.

The historical data of Wi-Fi connection contains the Y Wi-Fi lists, Y is a positive integer, and X is a positive integer smaller than or equal to M. The terminal may select from the historical data of Wi-Fi connection the X Wi-Fi lists each matching with the first Wi-Fi list, where each of the X Wi-Fi lists corresponds to one AP previously connected by the terminal.

In an implementation, at block 103, according to the first Wi-Fi list, the X Wi-Fi lists are determined from the historical data of Wi-Fi connection as follows.

31) A similarity value between the first Wi-Fi list and each of the Y Wi-Fi lists is determined to obtain Y similarity values.

32) X similarity values each larger than a second preset threshold are selected from the Y similarity values, and the X Wi-Fi lists each corresponding to one of the X similarity values are obtained.

At 31, the similarity value between the first Wi-Fi list and each of the Y Wi-Fi lists may be determined. Taking an $i^{th}$ Wi-Fi list as an example, in the first Wi-Fi list the number of APs each having the same service set identifier (SSID) and encryption scheme as one AP in the $i^{th}$ Wi-Fi list may be determined and denoted as a. A ratio of a to the number of APs in the first Wi-Fi list may be calculated and denoted as b. A ratio of a to the number of APs in the $i^{th}$ Wi-Fi list may be calculated and denoted as c. A mean of b and c may be calculated and denoted as (b+c)/2, which may be considered as a similarity value between the first Wi-Fi list and the $i^{th}$ Wi-Fi list. As such, the Y similarity values may be obtained. The second preset threshold may be set by default or by the user. The X similarity values each larger than the second preset threshold may be selected from the Y similarity values, and the X Wi-Fi lists each corresponding to one of the X similarity values may be obtained.

At block 104, the first Wi-Fi list is updated according to the X Wi-Fi lists.

In an implementation, information of some of or all the APs in the X Wi-Fi lists may be added to the first Wi-Fi list.

In an implementation, at block 104, the first Wi-Fi list is updated according to the X Wi-Fi lists as follows.

41) Information of Z APs is extracted from the X Wi-Fi lists, where Z is a positive integer.

42) The information of the Z APs is added to the first Wi-Fi list to obtain a second Wi-Fi list, and the second Wi-Fi list is displayed on the screen of the terminal.

The second Wi-Fi list may be generated according to the information of the Z APs. In order to facilitate the user to choose any one of the Z APs, the second Wi-Fi list may be displayed on the screen of the terminal. The Z APs may be displayed in a random order. Further, at least one AP may be selected from the second Wi-Fi list by the user to perform Wi-Fi scan.

In an implementation, each time after the terminal is connected to an AP (already recorded), information of the AP, such as an SSID, an BSSID, an encryption scheme, whether the AP is hidden or not, and so on, may be recorded in a local file. In addition, SSIDs and encryption schemes of other APs around the AP are recorded in a Wi-Fi list L, where the APs each have a signal strength value higher than R (for example, −90 db). The information of the AP and information in the Wi-Fi list L may be recorded in a Hashtable in a form of (AP information, Wi-Fi list L). Wi-Fi environment: according to the information of the APs obtained via current scan, APs having a signal strength value higher than R (for example, −90 db) may be selected to be recorded in a Wi-Fi list C; the terminal matches the APs in the Wi-Fi list C with the APs in the Wi-Fi list L of the historical data of Wi-Fi connection; if in the Wi-Fi list C the APs each having the same SSID and encryption scheme as one AP in the Wi-Fi list L account for 80%, an initial match successes. After the initial match of the Wi-Fi environment successes, if the AP previously connected by the terminal and corresponding to the Wi-Fi list L is in a non-hidden state, an SSID corresponding to the Wi-Fi list L is recorded in a Wi-Fi list S. SSIDs of the APs are extracted sequentially from the Wi-Fi list S to perform specified SSID scan. The terminal may be automatically connected to one AP when the AP is scanned. In this way, in the environment the terminal can be automatically connected to the AP that was previously connected by the terminal but is currently hidden.

It can be seen that, according to the implementations of the present disclosure, Wi-Fi scan is performed to obtain the information of the M APs, where M is a positive integer. The information of the N APs that satisfies the predetermined requirement is selected from the information of the M APs to generate the first Wi-Fi list, where N is a positive integer smaller than or equal to M. According to the first Wi-Fi list, the X Wi-Fi lists are determined from the historical data of Wi-Fi connection, where each of the X Wi-Fi lists corresponds to an AP previously connected by the terminal, the historical data of Wi-Fi connection contains the Y Wi-Fi lists, Y is a positive integer, and X is a positive integer smaller than or equal to M. The first Wi-Fi list is updated according to the X Wi-Fi lists. In this way, when the AP previously connected by the terminal is changed to a hidden state from a non-hidden state, the AP can be automatically searched. Additionally, more APs can be scanned. Therefore, an efficiency of Wi-Fi connection can be improved.

Figure 2:
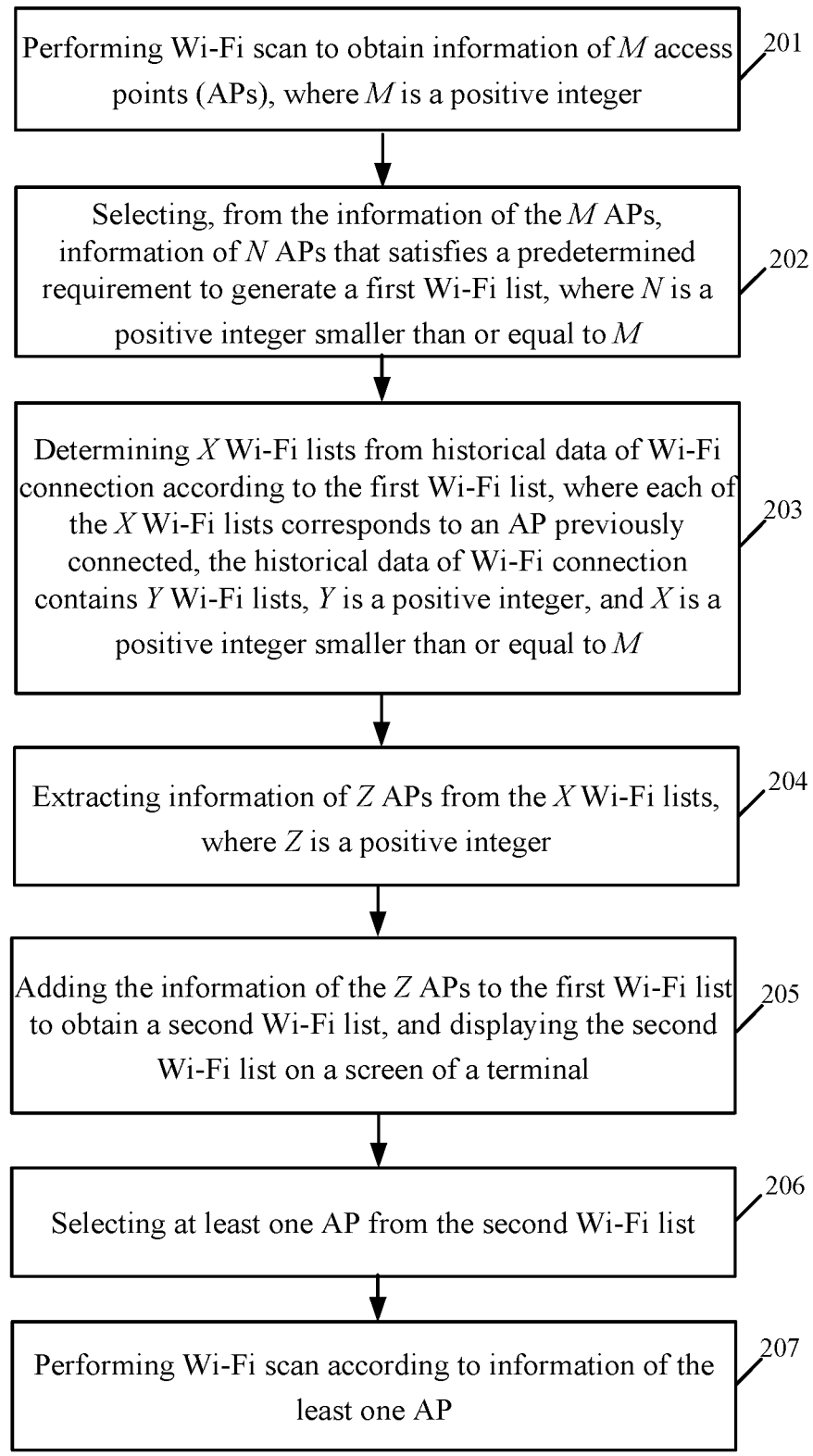
FIG. 2 is a flow chart illustrating a method for Wi-Fi connection according to a second implementation of the present disclosure.

In consistence with the above, referring to FIG. 2, FIG. 2 is a schematic flow chart illustrating a method for Wi-Fi connection according to a second implementation of the present disclosure. The method may include the following.

At block 201, Wi-Fi scan is performed to obtain information of M APs, where M is a positive integer.

At block 202, information of N APs is selected from the information of the M APs to generate a first Wi-Fi list, where the information of each of the N APs satisfies a predetermined requirement, and N is a positive integer smaller than or equal to M.

At block 203, according to the first Wi-Fi list, X Wi-Fi lists are determined from historical data of Wi-Fi connection, where each of the X Wi-Fi lists corresponds to an AP previously connected by a terminal, the historical data of Wi-Fi connection contains Y Wi-Fi lists, Y is a positive integer, and X is a positive integer smaller than or equal to M.

For detail descriptions of operations at blocks 201-203, reference may be made to corresponding operations of the method for Wi-Fi connection described in FIG. 1, and details are not be repeated herein.

At block 204, information of Z APs is extracted from the X Wi-Fi lists, where Z is a positive integer.

The Z APs having highest signal strength values may be selected from the X Wi-Fi list, and the information of the Z APs may be obtained, where Z is a positive integer.

For example, the information of the Z APs may be extracted from the X Wi-Fi lists as follows.

All APs in the X Wi-Fi lists are obtained. A deduplicating operation is performed on the all APs to obtain the Z APs. The information of the Z APs is obtained.

Two of the X Wi-Fi lists may contain a same AP. Therefore, all the APs may be extracted from the X Wi-Fi lists, and only one of the same APs is retained. For instance, if AP1 is contained in three Wi-Fi lists, then only one AP1 is retained. In this way, the Z APs and the information of the Z APs may be obtained, where Z is a positive integer.

At block 205, the information of the Z APs is added to the first Wi-Fi list to obtain a second Wi-Fi list, and the second Wi-Fi list is displayed on a screen of the terminal.

The second Wi-Fi list may be generated according to the information of the Z APs. In order to facilitate the user to choose any one of the Z APs, the second Wi-Fi list may be displayed on the screen of the terminal. The Z APs may be displayed in a random order. Further, at least one AP may be selected from the second Wi-Fi list by the user to perform Wi-Fi scan.

At block 206, at least one AP is selected from the second Wi-Fi list.

At least one AP may be selected from the second Wi-Fi list. For instance, the second Wi-Fi list may include an AP A, an AP B, and an AP C. The AP A and the AP B may be selected.

At block 207, Wi-Fi scan is performed according to information of the at least one AP.

The terminal may perform Wi-Fi scan according to information of the at least one AP. Taking the AP A and the AP B as an example, the terminal may perform Wi-Fi scan according to SSIDs of the AP A and the AP B.

In an implementation, at block 207, Wi-Fi scan may be performed according to an SSID and an encryption scheme of the at least one AP. In another implementation, Wi-Fi scan may be performed according to a BSSID of the at least one AP.

It can be seen that, according to the implementations of the present disclosure, Wi-Fi scan is performed to obtain the information of the M APs, where M is a positive integer. The information of the N APs that satisfies the predetermined requirement is selected from the information of the M APs to generate the first Wi-Fi list, where N is a positive integer smaller than or equal to M. According to the first Wi-Fi list, the X Wi-Fi lists are determined from the historical data of Wi-Fi connection, where each of the X Wi-Fi lists corresponds to an AP previously connected by the terminal, the historical data of Wi-Fi connection contains the Y Wi-Fi lists, Y is a positive integer, and X is a positive integer smaller than or equal to M. The first Wi-Fi list is updated according to the X Wi-Fi lists. In this way, when the AP previously connected by the terminal is changed to a hidden state from a non-hidden state, the AP can be automatically searched. Additionally, more APs can be scanned. Therefore, an efficiency of Wi-Fi connection can be improved.

In consistence with the above, an apparatus for implementing the above method for Wi-Fi connection is provided, as described in detail below.

Figure 3:
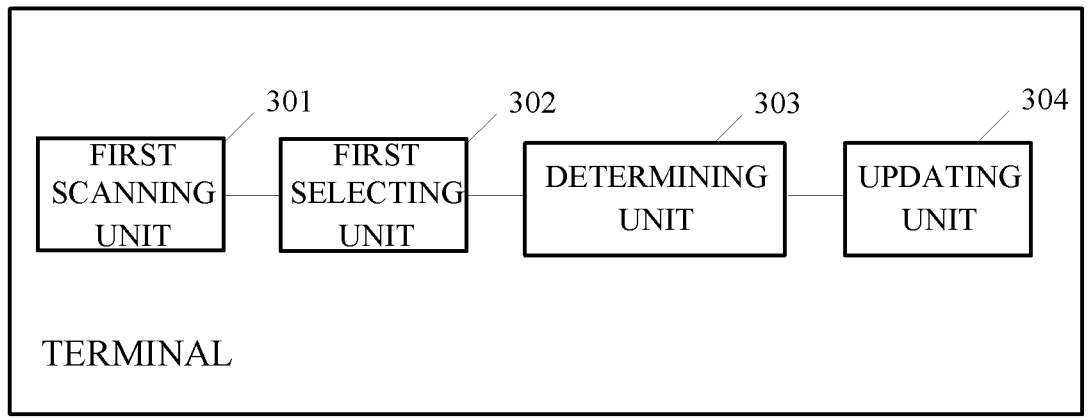
FIG. 3 is a structural diagram illustrating an apparatus for Wi-Fi connection according to an implementation of the present disclosure.

Referring to FIG. 3, FIG. 3 is a schematic structural diagram illustrating the apparatus for Wi-Fi connection according to an implementation of the present disclosure. The apparatus for Wi-Fi connection includes a first scanning unit 301, a first selecting unit 302, a determining unit 303, and an updating unit 304.

The first scanning unit 301 is configured to perform Wi-Fi scan to obtain information of M APs, where M is a positive integer.

The first selecting unit 302 is configured to select, from the information of the M APs, information of N APs to generate a first Wi-Fi list, where the information of each of N APs satisfies a predetermined requirement, and N is a positive integer smaller than or equal to M.

The determining unit 303 is configured to determine X Wi-Fi lists from historical data of Wi-Fi connection according to the first Wi-Fi list, where each of the X Wi-Fi lists corresponds to an AP previously connected, the historical data of Wi-Fi connection contains Y Wi-Fi lists, Y is a positive integer, and X is a positive integer smaller than or equal to M.

The updating unit 304 is configured to update the first Wi-Fi list according to the X Wi-Fi lists.

Figure 4:
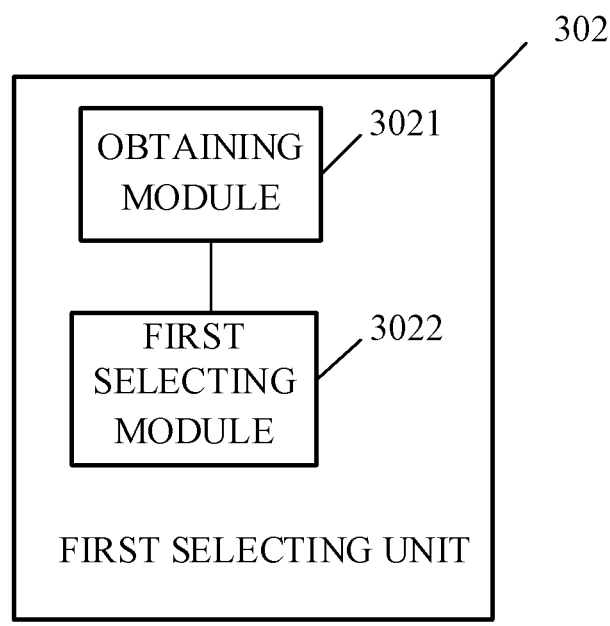
FIG. 4 is a structural diagram illustrating a first selecting unit of the apparatus for Wi-Fi connection illustrated in FIG. 3 according to an implementation of the present disclosure.

FIG. 4 is a detailed structure of the first selecting unit 302 of the apparatus for Wi-Fi connection illustrated in FIG. 4. As illustrated in FIG. 4, the first selecting unit 302 may include an obtaining module 3021 and a first selecting module 3022.

The obtaining module 3021 is configured to obtain a signal strength value of each of the M APs from the information of the M APs to obtain M signal strength values.

The first selecting module 3022 is configured to select, from the M signal strength values, N signal strength values each higher than a first preset threshold, and to obtain the information of the N APs each corresponding to one of the N signal strength values.

In an implementation, the first selecting unit 302 is configured to determine a distance between each of the M APs and the terminal to obtain M distances, to select, from the M distances, N distances each smaller than a preset distance threshold, and to obtain the information of the N APs each corresponding to one of the N distances.

Figure 5:
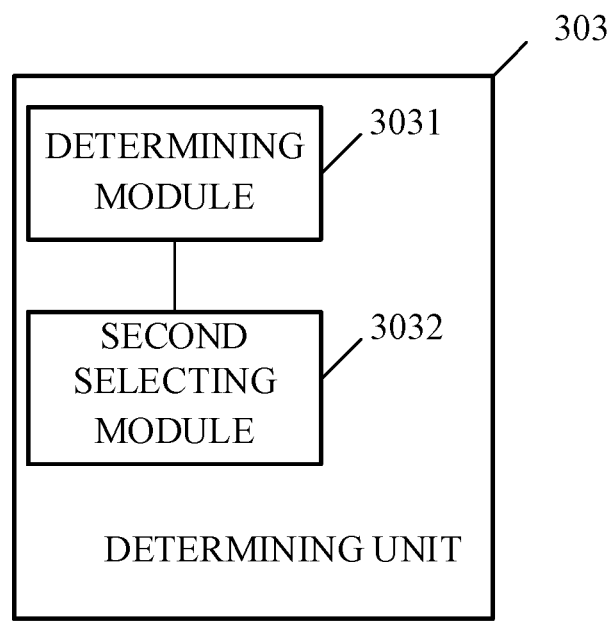
FIG. 5 is a structural diagram illustrating a determining unit of the apparatus for Wi-Fi connection illustrated in FIG. 3 according to an implementation of the present disclosure.

FIG. 5 is a detailed structure of the determining unit 303 of the apparatus for Wi-Fi connection illustrated in FIG. 3. As illustrated in FIG. 5, the determining unit 303 may include a determining module 3031 and a second selecting module 3032.

The determining module 3031 is configured to determine a similarity value between the first Wi-Fi list and each of the Y Wi-Fi lists to obtain Y similarity values.

The second selecting module 3032 is configured to select, from the Y similarity values, X similarity values each larger than a second preset threshold, and to obtain the X Wi-Fi lists each corresponding to one of the X similarity values.

Figure 6:
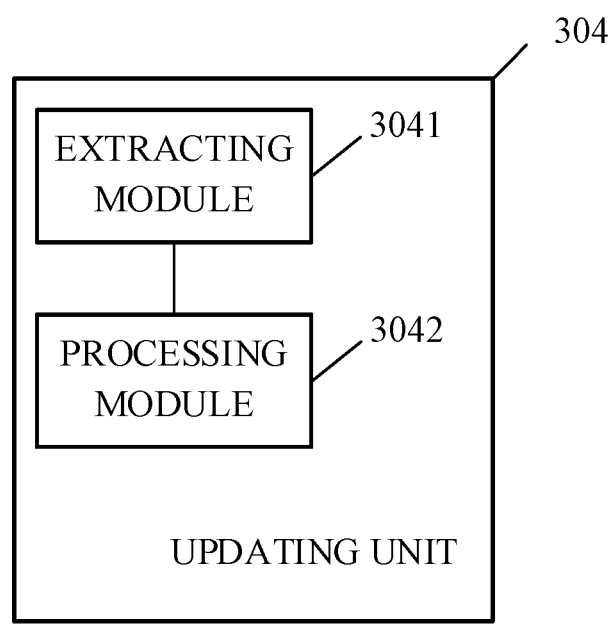
FIG. 6 is a structural diagram illustrating an updating unit of the apparatus for Wi-Fi connection illustrated in FIG. 3 according to an implementation of the present disclosure.

FIG. 6 is a detailed structure of the updating unit 304 of the apparatus for Wi-Fi connection illustrated in FIG. 3. As illustrated in FIG. 6, the updating unit 304 may include an extracting module 3041 and a processing module 3042.

The extracting module 3041 is configured to extract information of Z APs from the X Wi-Fi lists, where Z is a positive integer.

The processing module 3042 is configured to add the information of the Z APs to the first Wi-Fi list to obtain a second Wi-Fi list, and to display the second Wi-Fi list on a screen of the terminal.

In an implementation, the extracting module 3041 is configured to obtain all APs in the X Wi-Fi lists, to perform a deduplicating operation on the all APs to obtain the Z APs, and to obtain the information of the Z APs.

Figure 7:
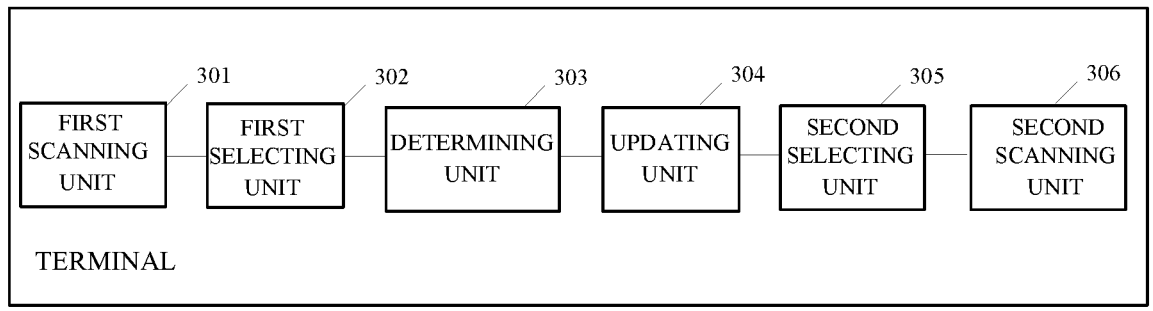
FIG. 7 is another structural diagram illustrating the apparatus for Wi-Fi connection illustrated in FIG. 3 according to an implementation of the present disclosure.

FIG. 7 is a variant structure of the apparatus for Wi-Fi connection illustrated in FIG. 3. Compared with the structure illustrated in FIG. 3, the structure illustrated in FIG. 7 further includes a second selecting unit 305 and a second scanning unit 306.

The second selecting unit 305 is configured to select at least one AP from the second Wi-Fi list, after the processing module 3042 displays the second Wi-Fi list on the screen of the terminal.

The second scanning unit 306 is configured to perform Wi-Fi scan according to information of the at least one AP.

In an implementation, the second scanning unit 306 is configured to perform Wi-Fi scan according to an SSID and an encryption scheme of the at least one AP.

In an implementation, the second scanning unit 306 is configured to perform Wi-Fi scan according to a BSSID of the at least one AP.

It can be seen that, according to the apparatus for Wi-Fi connection described in the implementations of the present disclosure, Wi-Fi scan is performed to obtain the information of the M APs, where M is a positive integer. The information of the N APs that satisfies the predetermined requirement is selected from the information of the M APs to generate the first Wi-Fi list, where N is a positive integer smaller than or equal to M. According to the first Wi-Fi list, the X Wi-Fi lists are determined from the historical data of Wi-Fi connection, where each of the X Wi-Fi lists corresponds to one AP previously connected by the terminal, the historical data of Wi-Fi connection contains the Y Wi-Fi lists, Y is a positive integer, and X is a positive integer smaller than or equal to M. The first Wi-Fi list is updated according to the X Wi-Fi lists. In this way, when the AP previously connected by the terminal is changed to a hidden state from a non-hidden state, the AP can be automatically searched. Additionally, more APs can be scanned. Therefore, an efficiency of Wi-Fi connection can be improved.

It is to be noted that, the apparatus for Wi-Fi connection described in the apparatus implementation of the disclosure is presented in the form of functional units. The term "unit" used herein should be understood as the broadest meaning as possible, and an object for implementing functions defined by each "unit" may be, for example, an application specific integrated circuit (ASIC), a single circuit, a processor (shared, dedicated, or chipset) and a memory for executing one or more software or firmware programs, a combinational logic circuit, and/or other suitable components that can achieve the above described functions.

For example, the first scanning unit 301 configured to perform Wi-Fi scan to obtain the information of the M APs may be implemented by a terminal illustrated in FIG. 4. A processor 3000 may perform Wi-Fi scan to obtain the information of the M APs by invoking executable program codes stored in a memory 4000.

Figure 8:
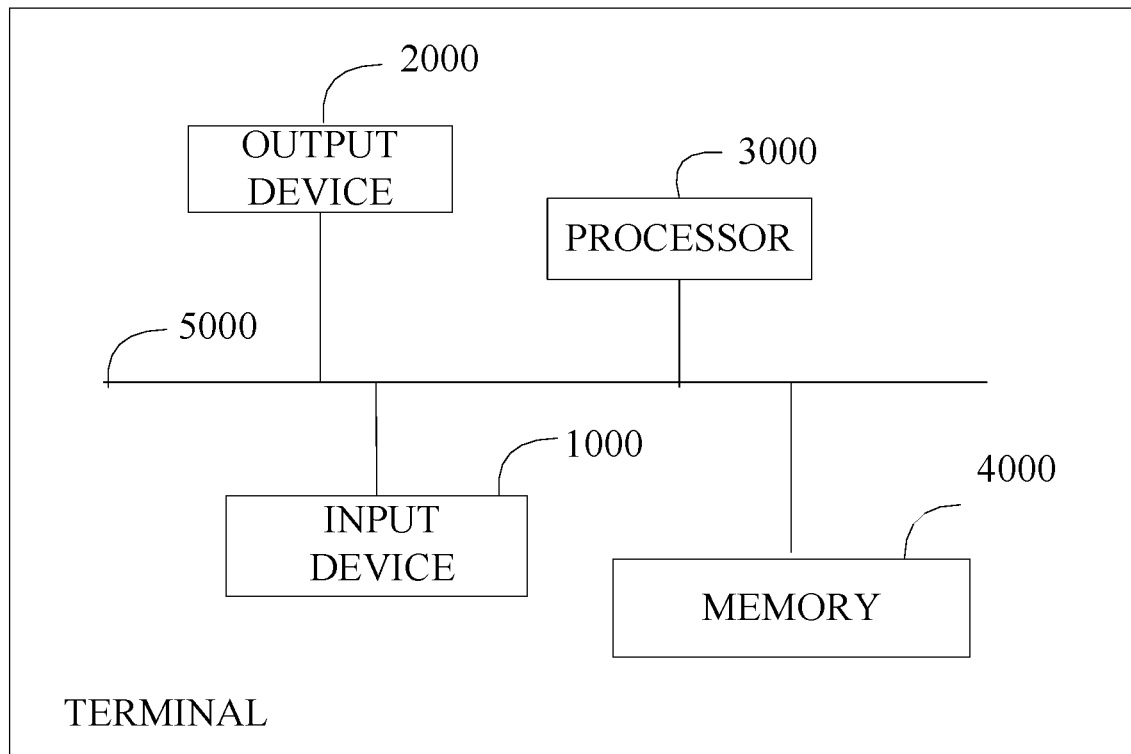
FIG. 8 is a schematic structural diagram illustrating a terminal according to an implementation of the present disclosure.

In consistence with the above, referring to FIG. 8, FIG. 8 is a schematic structural diagram illustrating the terminal according to an implementation of the present disclosure. The terminal described in the implementation includes at least one input device 1000, at least one output device 2000, at least one processor 3000 such as a central processing unit (CPU), and a memory 4000. The input device 1000, the output device 2000, the processor 3000, and the memory 4000 are coupled with each other through a bus 5000.

The input device 1000 may be a touch screen, a physical key, or a mouse.

The output device 2000 may be a display screen.

The memory 4000 may be a random access memory (RAM), and may be a non-volatile memory, such as a disk storage. The memory 4000 is configured to store a set of program codes, and the input device 1000, the output device 2000, and the processor 3000 are configured to invoke the program codes stored in the memory 4000 to perform the following.

The processor 3000 is configured to perform Wi-Fi scan to obtain information of M APs, where M is a positive integer, and to select, from the information of the M APs, information of N APs that satisfies a predetermined requirement to generate a first Wi-Fi list, where N is a positive integer smaller than or equal to M. The processor 3000 is further configured to determine X Wi-Fi lists from historical data of Wi-Fi connection according to the first Wi-Fi list, where each of the X Wi-Fi lists corresponds to an AP previously connected by the terminal, the historical data of Wi-Fi connection contains Y Wi-Fi lists, Y is a positive integer, and X is a positive integer smaller than or equal to M. The processor 300*o* is further configured to update the first Wi-Fi list according to the X Wi-Fi lists.

In an implementation, the processor 3000 configured to select the information of the N APs that satisfies the predetermined requirement from the information of the M APs is configured to obtain a signal strength value of each of the M APs from the information of the M APs to obtain M signal strength values, to select, from the M signal strength values, N signal strength values each higher than a first preset threshold, and to obtain the information of the N APs each corresponding to one of the N signal strength values.

In an implementation, the processor 3000 configured to select the information of the N APs that satisfies the predetermined requirement from the information of the M APs is configured to determine a distance between each of the M APs and the terminal to obtain M distances, to select, from the M distances, N distances each smaller than a preset distance threshold, and to obtain the information of the N APs each corresponding to one of the N distances.

In an implementation, the processor 3000 configured to determine the X Wi-Fi lists from the historical data of Wi-Fi connection according to the first Wi-Fi list is configured to determine a similarity value between the first Wi-Fi list and each of the Y Wi-Fi lists to obtain Y similarity values, to select, from the Y similarity values, X similarity values each larger than a second preset threshold, and to obtain the X Wi-Fi lists each corresponding to one of the X similarity values.

In an implementation, the processor 3000 configured to update the first Wi-Fi list according to the X Wi-Fi lists is configured to extract information of Z APs from the X Wi-Fi lists, to add the information of the Z APs to the first Wi-Fi list to obtain a second Wi-Fi list, and to display the second Wi-Fi list on a screen of the terminal, where Z is a positive integer.

In an implementation, the processor 3000 configured to extract the information of the Z APs from the X Wi-Fi lists is configured to obtain all APs in the X Wi-Fi lists, to perform a deduplicating operation on the all APs to obtain the Z APs, and to obtain the information of the Z APs.

In an implementation, after the processor 3000 displays the second Wi-Fi list on the screen of the terminal, the processor 3000 is further configured to select at least one AP from the second Wi-Fi list, and to perform Wi-Fi scan according to information of the at least one AP.

In an implementation, the processor 3000 configured to perform Wi-Fi scan according to the information of the at least one AP is configured to perform Wi-Fi scan according to an SSID and an encryption scheme of the at least one AP.

In an implementation, the processor 3000 configured to perform Wi-Fi scan according to the information of the at least one AP is configured to perform Wi-Fi scan according to a BSSID of the at least one AP.

The implementations of the present disclosure also provide a computer storage medium. The computer readable storage medium is configured to store computer programs, where the computer programs are operable to execute some of or all operations of the method for Wi-Fi connection described in any one of method implementations of the present disclosure.

The implementations of the present disclosure also provide a computer program product. The computer program product includes a non-transitory computer-readable storage medium that stores computer programs, where the computer programs are operable with a computer to execute some of or all operations of the method for Wi-Fi connection described in any one of method implementations of the present disclosure.

Although the disclosure has been described in conjunction with various implementations herein, however, other variations to the enclosed implementations can be understood and effected by those skilled in the art from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

Those skilled in the art should understand that the implementation of the disclosure may be provided as a method, an apparatus (equipment), or a computer program product. Therefore, the present disclosure may use a form of hardware only implementations, software only implementations, or implementations with a combination of software and hardware. Moreover, the present disclosure may use a form of a computer program product that is implemented on one or more computer-usable storage media (including but not limited to a disk memory, a CD-ROM, an optical memory, and the like) that include computer-usable program codes. The computer program is stored/distributed in a proper medium and is provided as or used as a part of the hardware together with another hardware, or may also use another allocation form, such as by using the Internet or another wired or wireless telecommunications system.

The disclosure is described in connection with flowcharts and/or block diagrams of the method, apparatus (equipment), and computer program product according to the implementations of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor, or a processor of other programmable data processing equipment to generate a machine, so that an apparatus for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing device, so that a series of operations are executed on the computer or the other programmable data processing device to generate processing implemented by the computer, and operations for realizing the function specified in one flow or many flows in the flowcharts and/or one block or many blocks in the block diagrams are provided by the instructions executed on the computer or the other programmable data processing device.

Although the disclosure is described in connection with specific characteristics and the implementations, obviously, various modifications and combinations may be made to the disclosure without departing from the spirit and scope of the disclosure. Correspondingly, the specification and the drawings are only exemplary descriptions about the disclosure defined by the appended claims, and are considered to cover any and all modifications, variations, combinations or equivalents in the scope of the disclosure. Obviously, those skilled in the art may make various modifications and variations to the disclosure without departing from the spirit and scope of the disclosure. Therefore, if these modifications and variations of the disclosure belong to the scope of the claims of the disclosure and equivalent technologies thereof, the disclosure is also intended to include these modifications and variations.

What is claimed is:

1. A method for wireless fidelity (Wi-Fi) connection, comprising:
    performing Wi-Fi scan to obtain information of M access points (APs), M being a positive integer;
    selecting, from the information of the M APs, information of N APs to generate a first Wi-Fi list containing the information of the N APs, the information of each of the N APs satisfying a predetermined requirement, and N being a positive integer smaller than or equal to M;
    determining, according to the first Wi-Fi list, X Wi-Fi lists from historical data of Wi-Fi connection, each of the X Wi-Fi lists containing information of an AP previously connected by a terminal, the historical data of Wi-Fi connection containing Y Wi-Fi lists, Y being a positive integer, and X being a positive integer smaller than or equal to M;
    extracting information of Z APs from the X Wi-Fi lists, the information of each of the Z APs comprising information indicative of whether the AP is in a hidden state or a non-hidden state;
    adding the information of the Z APs to the first Wi-Fi list to obtain a second Wi-Fi list; and
    displaying the second Wi-Fi list on a mobile terminal,
    wherein determining, according to the first Wi-Fi list, the X Wi-Fi lists from the historical data of Wi-Fi connection comprises:
        determining a similarity value between the first Wi-Fi list and each of the Y Wi-Fi lists to obtain Y similarity values;
        selecting, from the Y similarity values, X similarity values each larger than a second preset threshold; and
        obtaining the X Wi-Fi lists each corresponding to one of the X similarity values.

2. The method of claim 1, wherein selecting, from the information of the M APs,
    the information of the N APs comprises:
    obtaining a signal strength value of each of the M APs from the information of the M APs to obtain M signal strength values; and
    selecting, from the M signal strength values, N signal strength values each higher than a first preset threshold, and obtaining the information of the N APs each corresponding to one of the N signal strength values.

3. The method of claim 1, wherein selecting, from the information of the M APs,
    the information of the N APs comprises:
    determining a distance between each of the M APs and the terminal to obtain M distances; and
    selecting, from the M distances, N distances each smaller than a preset distance threshold, and obtaining the information of the N APs each corresponding to one of the N distances.

4. The method of claim 1, wherein extracting the information of the Z APs from the X Wi-Fi lists comprises:
    obtaining all APs in the X Wi-Fi lists;
    performing a deduplicating operation on the all APs to obtain the Z APs; and
    obtaining the information of the Z APs.

5. The method of claim 1, further comprising:
    selecting at least one AP from the second Wi-Fi list; and performing another Wi-Fi scan according to information of the at least one AP.

6. The method of claim 5, further comprising:
performing the another Wi-Fi scan according to a service set identifier (SSID) and an encryption scheme of at the at least one AP.

7. The method of claim 5, further comprising:
performing the another Wi-Fi scan according to a basic service set identifier (BSSID) of the at least one AP.

8. A terminal, comprising:
at least one processor; and
a computer readable memory, coupled to the at least one processor and storing at least one computer executable instruction therein, which when executed by the at least one processor, causes the at least one processor to carry out actions, comprising:
  performing Wi-Fi scan to obtain information of M access points (APs), M being a positive integer;
  selecting, from the information of the M APs, information of N APs to generate a first Wi-Fi list containing the information of the N APs, the information of each of the N APs satisfying a predetermined requirement, and N being a positive integer smaller than or equal to M,
  determining, according to the first Wi-Fi list, X Wi-Fi lists from historical data of Wi-Fi connection, each of the X Wi-Fi lists containing information of an AP previously connected by the terminal, the historical data of Wi-Fi connection containing Y Wi-Fi lists, Y being a positive integer, and X being a positive integer smaller than or equal to M;
  extracting information of Z APs from the X Wi-Fi lists, the information of each of the Z APs comprising information indicative of whether the AP is in a hidden state or a non-hidden state:
  adding the information of the Z APs to the first Wi-Fi list to obtain a second Wi-Fi list; and
  displaying the second Wi-Fi list on the terminal,
  wherein determining, according to the first Wi-Fi list, the X Wi-Fi lists from the historical data of Wi-Fi connection is caused to carry out actions comprises:
    determining a similarity value between the first Wi-Fi list and each of the Y Wi-Fi lists to obtain Y similarity values;
    selecting, from the Y similarity values, X similarity values each larger than a second preset threshold; and
    obtaining the X Wi-Fi lists each corresponding to one of the X similarity values.

9. The terminal of claim 8, wherein the at least one processor carrying out the action of selecting, from the information of the M APs, the information of the N APs is caused to carry out actions, comprising:
  obtaining a signal strength value of each of the M APs from the information of the M APs to obtain M signal strength values; and
  selecting, from the M signal strength values, N signal strength values each higher than a first preset threshold, and obtaining the information of the N APs each corresponding to one of the N signal strength values.

10. The terminal of claim 8, wherein the at least one processor carrying out the action of selecting, from the information of the M APs, the information of the N APs is caused to carry out actions, comprising:
  determining a distance between each of the M APs and the terminal to obtain M distances; and
  selecting, from the M distances, N distances each smaller than a preset distance threshold, and obtaining the information of the N APs each corresponding to one of the N distances.

11. The terminal of claim 8, wherein the at least one processor carrying out the action of extracting the information of the Z APs from the X Wi-Fi lists is caused to carry out actions, comprising:
  obtaining all APs in the X Wi-Fi lists;
  performing a deduplicating operation on the all APs to obtain the Z APs; and
  obtaining the information of the Z APs.

12. The terminal of claim 8, wherein the at least one computer executable instruction further causes the at least one processor to carry out actions, comprising:
  selecting at least one AP from the second Wi-Fi list; and
  performing another Wi-Fi scan according to information of the at least one AP.

13. The terminal of claim 12, wherein the at least one processor caused to carry out the action of performing the another Wi-Fi scan according to information of the at least one AP is caused to carry out an action, comprising:
  performing the another Wi-Fi scan according to a service set identifier (SSID) and an encryption scheme of at the at least one AP.

14. The terminal of claim 12, wherein the at least one processor caused to carry out the action of performing the another Wi-Fi scan according to information of the at least one AP is caused to carry out an action, comprising:
  performing the another Wi-Fi scan according to a basic service set identifier (BSSID) of the at least one AP.

15. A non-transitory computer-readable storage medium storing at least one computer program which, when executed by at least one processor, causes the at least one processor to carry out actions, comprising:
  performing Wi-Fi scan to obtain information of M access points (APs), M being a positive integer;
  selecting, from the information of the M APs, information of N APs, the information of each of the N APs satisfying a predetermined requirement, and N being a positive integer smaller than or equal to M,
  determining, from historical data of Wi-Fi connection, information of a plurality of candidate APs by comparing the information of the N APs with the historical data of Wi-Fi connection, each of the plurality of candidate APs being able to be connected by a terminal in current environment; and
  displaying the information of the plurality of candidate APs and the information of the N APs on the terminal for selection, wherein the information of each of the plurality of candidate APs comprises information indicative of whether the AP is in a hidden state or a non-hidden state,
  wherein determining, according to the first Wi-Fi list, the X Wi-Fi lists from the historical data of Wi-Fi connection causes the at least one processor to carry out actions, comprises:
    determining a similarity value between the first Wi-Fi list and each of the Y Wi-Fi lists to obtain Y similarity values;
    selecting, from the Y similarity values, X similarity values each larger than a second preset threshold; and
    obtaining the X Wi-Fi lists each corresponding to one of the X similarity values.

16. The non-transitory computer-readable storage medium of claim 15, wherein the at least one computer program is further executed by the at least one processor to carry out actions, comprising:
- selecting at least one AP from the plurality of candidate APs and the N APs; and
- performing another Wi-Fi scan according to information of the at least one AP.

* * * * *